(12) United States Patent
Guerrero Padron et al.

(10) Patent No.: US 11,852,102 B2
(45) Date of Patent: Dec. 26, 2023

(54) POWER DEVICE BASED ON ALKALI-WATER REACTION

(71) Applicants: TECNESIS 3000 SLU, Madrid (ES); IDA COVERTRUCK SL, Madrid (ES); UNIVERSIDAD POLITECNICA DE MADRID, Madrid (ES)

(72) Inventors: Juan Jose Guerrero Padron, Madrid (ES); Alberto Abanades Velasco, Madrid (ES); Jesus Sanchez Garcia, Torrejon de Ardoz (ES)

(73) Assignees: UNIVERSIDAD POLITECNICA DE MADRID, Madrid (ES); TECNESIS 3000 SLU, Madrid (ES); IDA, COVERTRUCK SL, Madrid (ES)

( * ) Notice: Subject to any disclaimer, the term of this patent is extended or adjusted under 35 U.S.C. 154(b) by 59 days.

(21) Appl. No.: 17/312,536

(22) PCT Filed: Dec. 4, 2019

(86) PCT No.: PCT/EP2019/083633
§ 371 (c)(1),
(2) Date: Jun. 10, 2021

(87) PCT Pub. No.: WO2020/120249
PCT Pub. Date: Jun. 18, 2020

(65) Prior Publication Data
US 2022/0056871 A1    Feb. 24, 2022

(30) Foreign Application Priority Data
Dec. 10, 2018 (EP) .................................... 18382904

(51) Int. Cl.
*F02K 9/60* (2006.01)
*F02K 9/52* (2006.01)
(Continued)

(52) U.S. Cl.
CPC ............... *F02K 9/605* (2013.01); *C06D 5/10* (2013.01); *F02K 9/42* (2013.01); *F02K 9/44* (2013.01); *F02K 9/52* (2013.01); *F02K 9/60* (2013.01)

(58) Field of Classification Search
CPC ...... F02K 9/44; F02K 9/50; F02K 9/52; F02K 9/605; F02K 9/97; C06D 5/10
See application file for complete search history.

(56) References Cited

U.S. PATENT DOCUMENTS

| | | | |
|---|---|---|---|
| 2,683,963 A * | 7/1954 | Chandler | ............... F02K 9/50 60/773 |
| 3,044,253 A | 7/1962 | Zwicky | |

(Continued)

FOREIGN PATENT DOCUMENTS

| | | |
|---|---|---|
| DE | 102006002394 A1 | 7/2007 |
| GB | 2153913 A | 8/1985 |
| WO | 2013048271 A1 | 4/2013 |

OTHER PUBLICATIONS

Lee Joong Nam; Database WPI; Section Ch, Week 201368; Thomson Scientific; Class E36; AN 2013-H88322; XP002790615 (not available).

(Continued)

*Primary Examiner* — Kyle Robert Thomas
(74) *Attorney, Agent, or Firm* — LUCAS & MERCANTI, LLP

(57) ABSTRACT

Power device based on alkali-water reaction, having a reaction chamber to carry out a chemical reaction between water and alkali element, having an exhaust nozzle to exhaust the reaction products generated in the reaction chamber, with a siphon tube connected to the exhaust nozzle, a nozzle shutter plate sealing the exhaust nozzle, and an external pressure inlet. The device has a water reservoir to store transfer water to the reaction chamber and an alkali (Continued)

reservoir to store and transfer an alkali element to the reaction chamber, and transfer device connecting the reaction chamber to both reservoirs to transmit the pressure generated in reaction chamber by part of the reaction products to the reservoirs, providing the transfer of water and alkali element from both reservoirs to the reaction chamber.

5 Claims, 3 Drawing Sheets

(51) Int. Cl.
*F02K 9/44* (2006.01)
*C06D 5/10* (2006.01)
*F02K 9/42* (2006.01)

(56) References Cited

U.S. PATENT DOCUMENTS

| | | | | |
|---|---|---|---|---|
| 3,158,994 A | * | 12/1964 | Hodgson | C06B 27/00 |
| | | | | 60/260 |
| 3,525,223 A | | 8/1970 | Reinhart et al. | |
| 3,991,559 A | * | 11/1976 | Oda | F23B 7/00 |
| | | | | 60/39.461 |
| 2010/0064925 A1 | * | 3/2010 | Cavalieri | F02K 9/24 |
| | | | | 102/376 |

OTHER PUBLICATIONS

International Search Report and Written Opinion for PCT/EP2019/083633 dated Feb. 24, 2020.

* cited by examiner

POWER DEVICE BASED ON ALKALI-WATER REACTION

CROSS-REFERENCE TO RELATED APPLICATIONS

This application is a 371 of PCT/EP2019/083633, filed Dec. 4, 2019, which claims the benefit of European Patent Application No. 18382904.3, filed Dec. 10, 2018, each of which are incorporated herein by reference.

FIELD OF THE INVENTION

The present invention is encompassed within the field of power generation, and specifically the power generation by means of a chemical reaction between water and an alkali element, as sodium (Na) or potassium (K). The highly exothermic chemical reaction produced when water and the alkali metal get in contact in given proportions produces a very fast delivery of energy. The invention could be related to the field of rocket and projectile design in the aerospace field, and more specifically to the application of the alkali as propellant of the rocket or projectile.

This invention relates in particular to a power device configured to provide, confine and control such chemical reaction between water and an alkali element, to produce useful power in the form of mechanical work or impulsion. This power device has a reaction chamber, reservoirs for water and the alkali element, and transfer means connecting the reaction chamber to both reservoirs, to transmit the pressure generated in the reaction chamber to the reservoir, thus providing the transfer of the water and the alkali element from both reservoir to the reaction chamber.

BACKGROUND

The reaction between alkali metals, as sodium or potassium, and water, are extremely exothermic and violent. Nowadays there are no devices for a safe and viable application of these reactions for controlled power generation. However, if such reactions were controlled and if alkali metals become an energy source, they will provide abundant energy resources as sodium, for instance, is the sixth more abundant element in Earth and potassium is the seventh, both in combined forms as salts (NaCl, and KCl).

Most of the power applications of chemical sources are based on combustion due to three fundamental reasons: the abundance of oxygen in the composition of the atmospheric air as main oxidizing agent, the abundance of fuels, either from fossil or biomass origin, and the high heating release of combustion reactions. Other oxidizing reactions has been scarcely developed except hydrogen fuel cell applications.

The conversion devices of chemical energy into mechanical energy (combustion engines, jet propulsion) have as main goal the enhancement of the conversion efficiency and the reduction of the environmental impact of the reaction products (NOx, SOx, . . . ) and greenhouse gases emissions (mainly CO2). The former are responsible of acidification of the soil, and the latter is well known for its impact on global warming. Additional care must be taken from gaseous hydrocarbons (main chemical energy carriers) leakage to the atmosphere during extraction and transportation. The release or evacuation of gases from combustion processes is unavoidable as they must be exhausted when produced to allow a continuous and stable flame. Therefore, combustion has to deal with two main facts: mechanical conversion efficiency and emissions.

Combustion processes require the application of an activation energy to the reactants for the initialization of the reaction, either by a pressure increase (as self-ignited engines) or by a spark, or any other ignition mean. In many cases, pressure cycling in the reaction chamber, as in the case of alternative combustion engines, or very high pressure requirements in jet propulsion, implies complex designs. On the other hand, combustion products has to be rapidly evacuated as they can extinguish the reaction and stop the engine function.

With regard to the application of the combustion processes, solid propellant rockets are classified as Double Base propellants (also called Double-Base or DB) and Composite propellants. DBs are basically made of Nitrocellulose (NC) and Nitroglycerin (NG) up to 90% in mass and much smaller amounts of other additives. Composites are made of an elastic polymer such as HTPB or CTPB binding the oxidizing agent (either Ammonium Perchlorate or Ammonium Nitrate) with the corresponding reducing agent (aluminum or magnesium) and other additives up to 15%.

Conventional propellants present an aging problem. A very low rate of reactions are produced in the combustion chamber of the rocket during storage as the fuel and oxidizing agent are in contact. The residual heat of this reactions feed continuously new reactions, that might end in the autoignition of the propellant. To absorb NOx emissions and heat that is produced in this process, some additives are embedded in the propellant. Nevertheless, those additives are saturated or consumed with time, limiting the operative lifetime of solid propelled rockets to a maximum of 20 years, requiring surveillance during their storage.

The maintenance and survey of those rockets imply the realization of destructive tests to evaluate the real state of the propellant. Chemical analysis are made on samples extracted from the rocket, and additional tests are done provoking the ignition of the rocket in static benches.

It is therefore desirable a power device based on alkali-water reaction, providing a powerful source of energy in a controlled way, avoiding the drawbacks of the conventional combustion propellants.

DESCRIPTION OF THE INVENTION

The present invention provides a power device based on alkali-water reaction, which comprises an exhaust nozzle to exhaust the chemical reaction products generated in a reaction chamber, which carries out a chemical reaction between water (oxidizing agent) and an alkali element. The alkali element is preferably sodium, but may be potassium or lithium as well, and it is stored and transferred to the reaction chamber in liquid state.

In this reaction, water is always in excess. The device of the present invention controls the reaction during a given period of time, which may be from a few seconds to some minutes, depending on the amount of initial reactants and its reaction rate. This device provide the means to put safely in contact the reactants, alkali and water, in a reaction chamber with the aim of producing useful power.

The reaction chamber comprises a siphon tube inside, which is connected to the exhaust nozzle by means of a nozzle shutter plate sealing the exhaust nozzle and configured to be broken at a predetermined pressure. The reaction chamber further comprises an external pressure inlet to transmit pressure to the interior of the reaction chamber when needed, i.e. to initiate the operation of the device.

The power device additionally has a water reservoir which stores water, and transfers it to the reaction chamber, and an alkali reservoir which stores an alkali element, and transfers it to the reaction chamber.

Further, the power device comprises transfer means connecting the reaction chamber to both reservoirs and configured to transmit pressure generated in the reaction chamber to the reservoirs, thus providing the transfer of the water and the alkali element from both reservoirs to the reaction chamber.

With regard to a particular embodiment of the invention, the transfer means has a first transfer duct connecting the water reservoir to the reaction chamber, which transfers the water from said water reservoir to the reaction chamber, and a second transfer duct connecting the alkali reservoir to the reaction chamber, which transfers the alkali element from the alkali reservoir to the reaction chamber.

Moreover, the transfer means comprises a first pressure transmitting duct connecting the reaction chamber to the water reservoir, which transmits the pressure generated in the reaction chamber to the water reservoir, and a second pressure transmitting duct connecting the reaction chamber to the alkali reservoir, which transmits the pressure generated in the reaction chamber to the alkali reservoir.

The transfer means further has a first piston placed inside the water reservoir which is displaced by means of the pressure transmitted by the reaction chamber through the first pressure transmitting duct, thus transferring the water to the reaction chamber through the first transfer duct, and a second piston placed inside the alkali reservoir which is displaced by means of the pressure transmitted by the reaction chamber through the second pressure transmitting duct, thus transferring the alkali element to the reaction chamber through the second transfer duct.

So, with regard to this particular embodiment, the reactants, water and the alkali element, are stored respectively in the water reservoir and the alkali reservoir, and they are transferred to the reaction chamber via the transfer ducts. The highly exothermic reaction between the water and the alkali produces a fast increase of the reaction chamber pressure that is maintained during the reactants ingress. This pressure is transmitted respectively to the first piston of the water reservoir and to the second piston of the alkali reservoir through calibrated non-return valves, displacing said pistons.

The pressure at the face of the pistons in contact with water and alkali is lower than the pressure at the face in contact with the exhausted gases (mainly water vapour) of the reaction chamber, producing a controlled displacement of the pistons, thus transferring the water and liquid alkali to the reaction chamber through the transfer ducts. Therefore, the pressure generated in the reaction chamber is the cause of the continuous feeding of the reactants from the water and liquid alkali reservoirs.

The reaction products are exhausted through the nozzle after traversing the siphon tube, what allows an additional residence time for the complete development of the reaction. At the beginning of the device operation, the nozzle is sealed by a nozzle shutter plate, which is a membrane with the required thickness as to increase the reaction chamber pressure up to the nominal operation pressure. Then, the nozzle shutter plate breaks and the reaction products are released through the nozzle in critical conditions for the initiation of the propulsion. The process is continuous until at least one of the reactants is consumed.

According to an alternative embodiment of the invention, the reaction chamber is concentrically placed inside a cylindrical inner cavity of a rocket, the reaction chamber having a top base. In this embodiment, the water reservoir and the alkali reservoir are separated by a vertical separation wall, and they are placed inside the cylindrical inner cavity, located at the same height, and separated from the reaction chamber by means of the top base of said reaction chamber.

With regard to this embodiment, the transfer means comprise a first injector on the top base of the reaction chamber, which connects the water reservoir to the reaction chamber and transfers the water from the water reservoir to the reaction chamber, and a second injector on the top base of the reaction chamber, which connects the alkali reservoir to the reaction chamber and transfers the alkali element from the alkali reservoir to said reaction chamber.

According to this embodiment the transfer means further has a variable cylindrical cavity placed over the reaction chamber, which includes both reservoirs, and having in turn a central piston forming the upper base of the cavity, and a mobile lateral wall joined to the central piston.

The transfer means also includes a variable pressurization cavity over the variable cylindrical cavity and separated from it by means of the central piston, wherein the siphon tube connects the exhaust nozzle, and wherein the external pressure inlet is placed. There are orifices placed in the portion of the siphon tube located in the variable pressurization cavity, configured to transmit the pressure generated in the reaction chamber to the variable pressurization cavity. Therefore, according to this embodiment, the central piston is displaced by means of the pressure transmitted by the reaction chamber to the variable pressurization cavity, thus transferring both water and alkali element to the reaction chamber through the first and second injectors.

Therefore, the alternative embodiment is intended for rocket developments. According to this alternative embodiment, the water and liquid alkali are stored in the cylindrical inner cavity of the rocket. Both components are separated by at least a vertical separation wall. In this case, the ejection of the reaction products through the exhaust nozzle is converted in inertial impulse when the nozzle shutter plate is broken. The central piston is moved by the differential forces applied by the pressurization cavity, under the pressure of the reaction due to the pressure transmission through the orifices in the siphon tube at one side of the piston and the pressure of the inner cavity of the rocket at the other side of that piston.

The process starts when a pressure increase is injected through the external pressure inlet into the variable pressurization cavity. The overpressure in the pressurization cavity forces the displacement of the central piston, displacing the mobile lateral wall of the of the variable cylindrical cavity, and injecting water and the alkali through the injectors, into the reaction chamber, where the alkali element and water react.

The chemical reaction increases the pressure in the reaction chamber and the variable pressurization cavity, as they are connected by the orifices in the siphon tube. The nozzle shutter plate breaks when a calibrated pressure is achieved in the reaction chamber and the variable pressurization cavity, and the reaction products are ejected through the siphon tube and the nozzle, producing the rocket impulsion. The orifices in the siphon tube harmonized the pressure at both sides of the central piston, displacing that central piston until both reactants in the water reservoir and the alkali reservoir are consumed. The reaction is extinguished when the central piston reaches the injectors.

The water and alkali masses and volumes will be designed as to account for water in excess, adapting the position of the reactants separation walls according to the volume relationship required.

According to a particular embodiment of the invention, the power device has heating means to heat the alkali reservoir and keep the alkali element at a predetermined temperature, in order to keep the alkali element in liquid state. In case of sodium temperature should be higher than 98° C., whereas the case of potassium the temperature should be higher than 64° C. Particularly, these heating means may have a tank with oil at a predetermined temperature, in which the alkali reservoir is submerged.

So, this invention shows a device with the aim of controlling the development of the reaction between an alkali metal and water, to obtain a useful profit of the energy release. This device is useful in the field of rocket and projectile design in the aerospace domain, and specifically for the use of alkali as solid propellant.

Therefore, the power device based on alkali-water reaction of the present invention provides a powerful source of energy in a controlled way, having advantages over conventional combustion propellants.

The sodium or potassium reaction with water achieved in the power device of the present invention does not require activation energy, being initiated spontaneously with the mere contact between reactants. The power rate (energy release vs time) of alkali-water reactions is higher than combustion processes, what produces its explosive appearance. Nevertheless, the reaction heat, for instance, of sodium-water reaction (8-9 MJ/kg) is lower than for fossil fuel combustion (30-45 MJ/kg).

Moreover, regarding the alkali-water reaction, its lower heating value compared with combustion reactions is compensated with other additional advantages, as it does not need activation energy or ignition means. Further, its reaction products do not extinguish the reaction or affect dramatically its kinetics, maintaining a high power generation rate. Those advantages may lead to a high availability of energy resources if a viable technology is develop for that purpose. The products of the sodium-water reaction are $H_2$ and NaOH. Additional energy can be extracted by the oxidation of the hydrogen with available oxygen, and the sodium hydroxide combines very easily with carbon dioxide ($CO_2$) forming sodium carbonate ($Na_2CO_3$), an inert compound that is very soluble in water. The emissions of NaOH can be avoided by its extraction from the reactor, being an appreciated raw material in chemical industry. The same discussion may be done for the potassium-water reaction.

Further, the alkali-water reactions prevent the logistic problem of conventional propellants disclosed above related to the need of large quantities of propellant for destructive tests to evaluate the real state of the propellant. Alkali elements are stable components if they are well insulated. In addition, environmental impacts from its reaction products may be more limited than those of conventional propellants, what is a requirement for new generation fuels.

Besides, the production of sodium or potassium are well known processes, granting the availability of the propellant. Sodium is synthetized from salt (NaCl) by the Down electrolytic process, obtaining purities up to 95%, enough for the application of this invention. The technology is simpler than the production processes for conventional propellants, that are produced in multiple stages. Potassium is synthetized from KCl and Na, to produce salt (NaCl) and metallic K.

The features, functions and advantages that have been discussed can be achieved independently in various embodiments or may be combined in yet other embodiments. Further details of which can be seen with reference to the following description and drawings.

BRIEF DESCRIPTION OF THE DRAWINGS

Next, in order to facilitate the comprehension of this disclosure, in an illustrative rather than limitative manner a series of embodiments with reference to a series of figures shall be made below.

Figure 1:
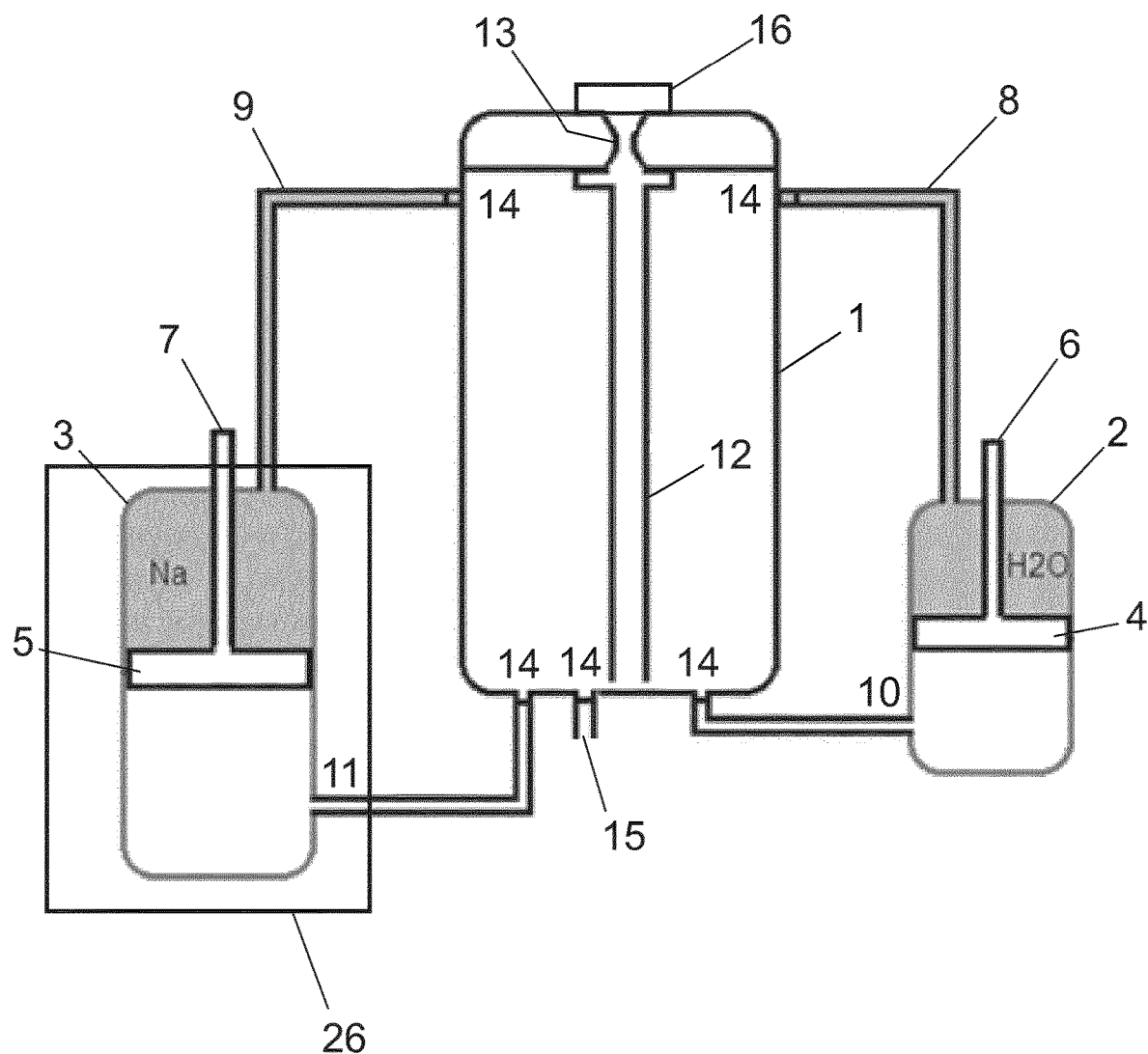
FIG. 1 is a front section view of a particular embodiment of the power device of the present invention, showing the main elements.

These figures refer to the following set of elements:
1. reaction chamber
2. water reservoir
3. alkali reservoir
4. first piston
5. second piston
6. first piston rod
7. second piston rod
8. first transfer duct
9. second transfer duct
10. first pressure transmitting duct
11. second pressure transmitting duct
12. siphon tube
13. exhaust nozzle
14. non-return valve
15. external pressure inlet
16. nozzle shutter plate
17. orifices of the siphon tube
18. central piston
19. mobile wall
20. first injector
21. second injector
22. variable cylindrical cavity formed by both reservoirs
23. inner cavity of the rocket
24. ring coupling siphon tube and nozzle
25. a variable pressurization cavity
26. heating means of the alkali reservoir
27. rocket
28. separation wall
29. top base of the reaction chamber

DETAILED DESCRIPTION

The present disclosure refers to a power device based on alkali-water reaction.

As it can be seen in the figures, the power device has an exhaust nozzle 13, which exhausts the chemical reaction products generated in a reaction chamber 1 configured to carry out a chemical reaction between water and an alkali element. According to preferred embodiments of the invention, the exhaust nozzle 13 is placed at the upper part of the reaction chamber 1, although it could be placed in different locations of said reaction chamber 1, e.g. at the bottom or at a side thereof.

Figure 2:
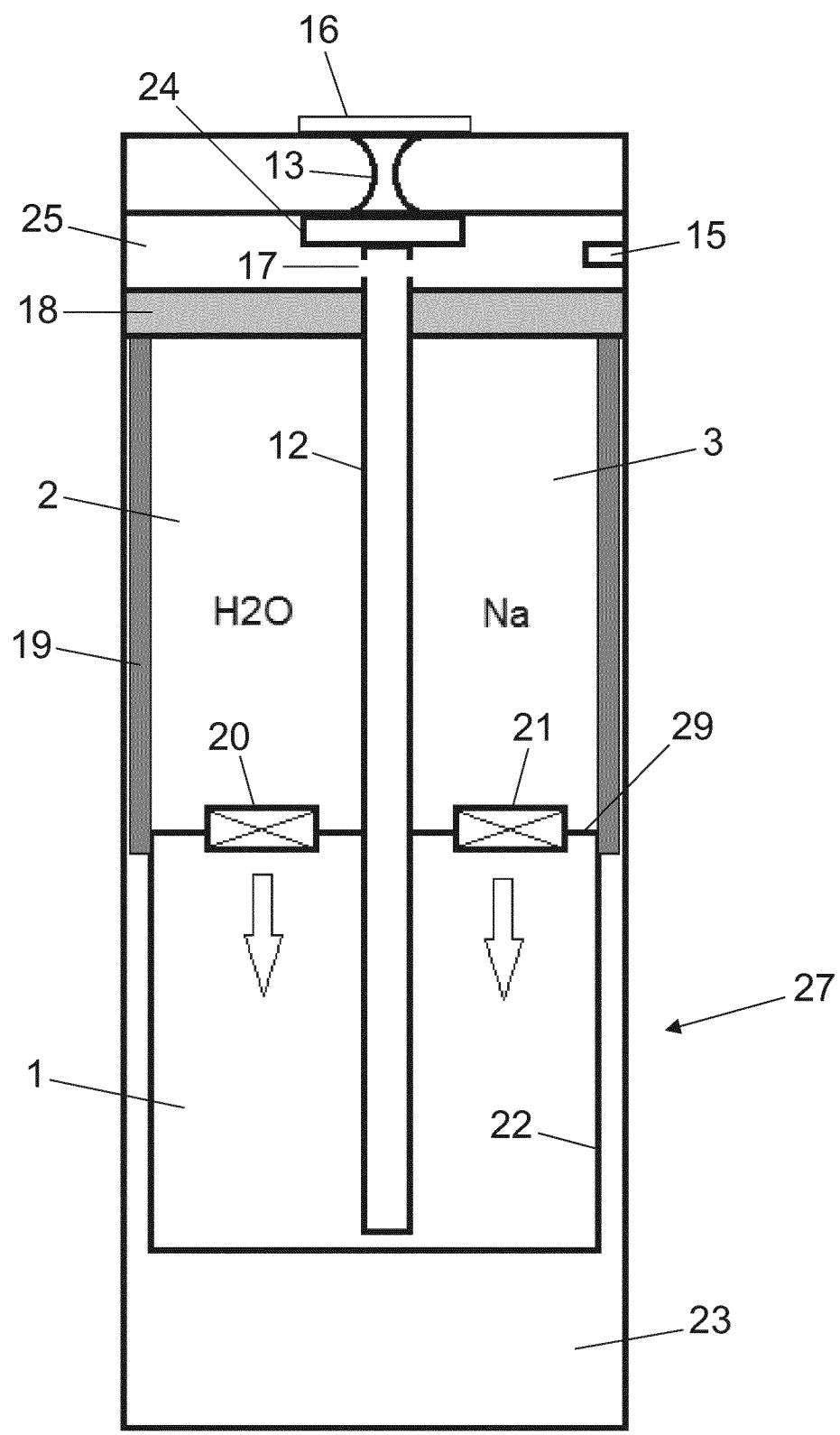
FIG. 2 is a front section view of an alternative embodiment of the power device of the present invention, showing the main elements thereof.

As shown in FIGS. 1 and 2, the reaction chamber 1 has a siphon tube 12 inside, which is connected to the exhaust nozzle 13 by means of a nozzle shutter plate 16 sealing the exhaust nozzle 13. This nozzle shutter plate 16 is configured to be broken at a predetermined pressure. Preferably, the siphon tube 12 is placed along the entire length of the reaction chamber 1, although alternatively it could be placed along only certain section of said reaction chamber 1.

Further, the reaction chamber 1 comprises an external pressure inlet 15, which is configured to transmit pressure to the interior of the reaction chamber 1, from an external source, when needed to initiate the process and the operation of the device.

The power device of the present invention has a water reservoir 2 for storing water and transferring said water to the reaction chamber 1, and an alkali reservoir 3 for storing an alkali element and transferring said alkali element to the reaction chamber 1.

Additionally, the power device comprises transfer means that connects the reaction chamber 1 to both reservoirs 2,3 and transmits the pressure generated in the reaction chamber 1 to said reservoirs 2,3, thus providing the transfer of the water and the alkali element from both reservoirs 2,3 to the reaction chamber 1.

FIG. 1 shows a particular embodiment of the present invention, in which the transfer means have a first transfer duct 8 connecting the water reservoir 2 to the reaction chamber 1, which transfers the water from the water reservoir 2 to the reaction chamber 1, and a second transfer duct 9 connecting the alkali reservoir 3 to the reaction chamber 1, which transfers the alkali element from the alkali reservoir 3 to the reaction chamber 1.

This particular embodiment of the invention shown in FIG. 1 comprises a first pressure transmitting duct 10 connecting the reaction chamber 1 to the water reservoir 2, which transmits the pressure generated in the reaction chamber 1 to the water reservoir 2, and a second pressure transmitting duct 11 connecting the reaction chamber 1 to the alkali reservoir 3, which transmits the pressure generated in the reaction chamber 1 to the alkali reservoir 3.

Further, this particular embodiment of the invention has a first piston 4 inside the water reservoir 2, configured to be displaced by means of the pressure transmitted by the reaction chamber 1 through the first pressure transmitting duct 10, so transferring the water to the reaction chamber 1 through the first transfer duct 8, and a second piston 5 inside the alkali reservoir 3 configured to be displaced by means of the pressure transmitted by the reaction chamber 1 through the second pressure transmitting duct 11, so transferring the alkali element to the reaction chamber 1 through the second transfer duct 9.

Therefore, according to this embodiment shown in FIG. 1, the reactants are stored respectively in the water reservoir 2 and the alkali reservoir 3, and they are transferred to the reaction chamber 1 via the transfer ducts 8,9. The highly exothermic reaction between the water and the alkali produces a fast increase of the pressure of the reaction chamber that is maintained during the reactants ingress. This pressure is transmitted respectively to the first piston 4 inside the water reservoir 2 and to the second piston 5 inside the alkali reservoir 3 through the calibrated non-return valves 14, thus moving the pistons 4,5.

The pistons 4,5 are exposed to the pressure of the reaction chamber 1 lowered and tuned by the non-return valves 14 and compensated by the cross section design of the first piston rod 6 and second piston rod 7, which are under atmospheric pressure since they traverse the water reservoir 2 and alkali reservoir 3 respectively. The pressure at the face of the pistons 4,5 in contact with water and alkali is lower than the pressure at the face in contact with the exhausted gases (mainly water vapor) from the reaction chamber 1, producing a controlled displacement of the pistons 4,5, thus transferring the water and alkali element to the reaction chamber 1 through the transfer ducts 8,9.

The pressure generated in the reaction chamber 1 causes the continuous feeding of the reactants from the water alkali reservoirs 2,3.

The reaction products are exhausted through the nozzle 13 traversing the siphon tube 12, what allows an additional residence time for the complete development of the reaction. At the beginning of the reactor operation, the nozzle 13 is sealed by a nozzle shutter plate 16, which is a membrane with the required thickness as to increase the pressure of the reaction chamber 1 up to the nominal operation pressure. Then, the nozzle shutter plate 16 breaks and the reaction products are released through the nozzle 13 in critical conditions for the initiation of the propulsion. The process is continuous until at least one of the reactants is consumed.

Figure 3:
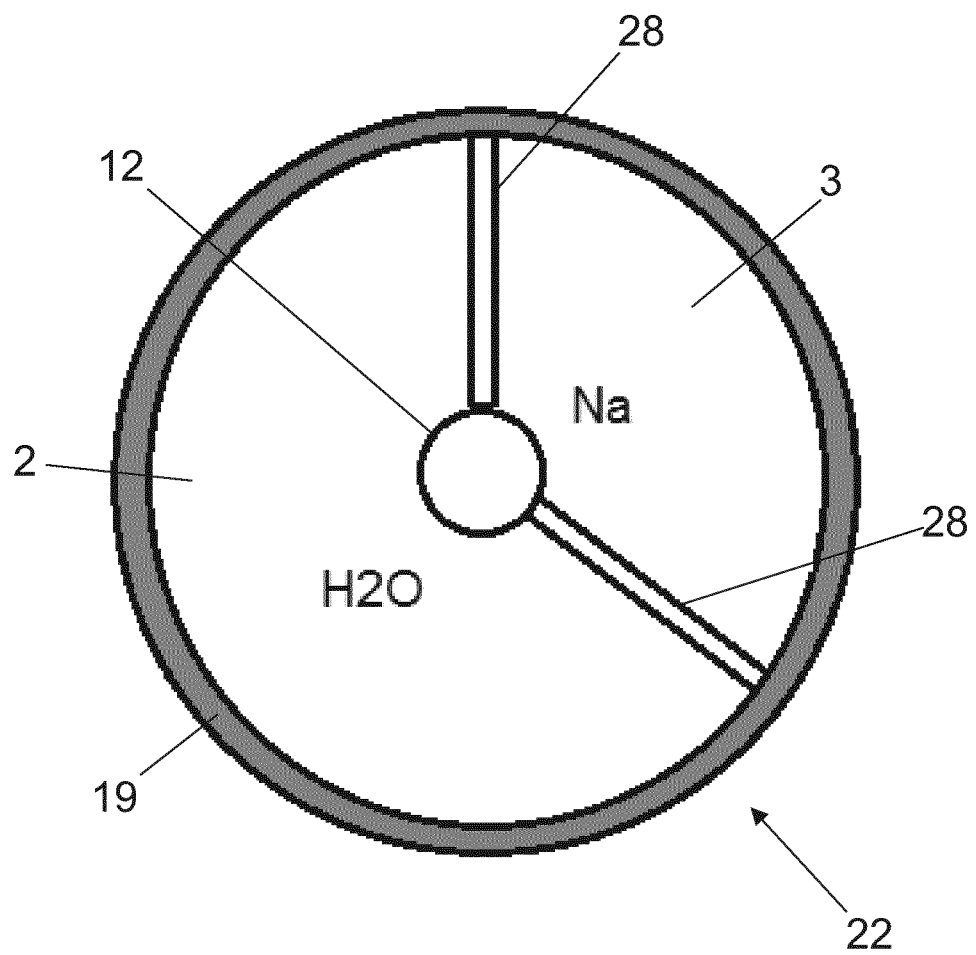
FIG. 3 is a plant section view of the power device of FIG. 2.

FIGS. 2 and 3 discloses an alternative embodiment of the present invention, in which the reaction chamber 1 is concentrically placed inside a cylindrical inner cavity 23 of a rocket 27, in such a way that the reaction chamber 1 a top base 29, and the water reservoir 2 and the alkali reservoir 3 are separated by at least a vertical separation wall 28, both being placed inside the cylindrical inner cavity 23, at the same height, and separated from the reaction chamber 1 by means of the top base 29.

With regard to this embodiment shown on FIGS. 2 and 3, the transfer means has a first injector 20 on the top base 29 of the reaction chamber 1, which connects the water reservoir 2 to the reaction chamber 1, and is configured to transfer the water from the water reservoir 2 to the reaction chamber 1, and a second injector 21 on the top base 29 of the reaction chamber 1, which connects the alkali reservoir 3 to the reaction chamber 1, and is configured to transfer the alkali element from the alkali reservoir 3 to said reaction chamber 1.

The transfer means of this embodiment have a variable cylindrical cavity 22, which is placed over the reaction chamber 1, and includes both reservoirs 2,3. This cylindrical cavity 22 is formed by a central piston 18, which makes the upper base thereof, and a mobile lateral wall 19 joined to the central piston 18.

Regarding this embodiment, the transfer means additionally has a variable pressurization cavity 25 over the variable cylindrical cavity 22, which is separated from the variable cylindrical cavity 22 by means of the central piston 18. It is inside this variable pressurization cavity 25 where the siphon tube 12 connects the exhaust nozzle 13, and where the external pressure inlet 15 is placed for providing pressure from an external source, when needed to initiate the process and the operation of the device. There are orifices 17 placed in the portion of the siphon tube 12 located inside the variable pressurization cavity 25, which are configured to transmit the pressure generated in the reaction chamber 1 to the variable pressurization cavity 25. According to this embodiment, the central piston 18 is displaced by means of the pressure transmitted by the reaction chamber 1 to the variable pressurization cavity 25, thus transferring both water and alkali element to the reaction chamber 1 through the first and second injectors 20,21.

Therefore, according to this embodiment shown in FIG. 2 intended for a rocket 27, initially, the water and alkali element are stored inside a cylindrical inner cavity 23 of the rocket 27. Water is stored in a water reservoir 2 and the alkali element in an alkali reservoir 3. Both components are separated by at least a vertical separation wall 28, shown in the cross section sketch depicted in FIG. 3. In this case the exhaust nozzle 13 converts the ejection of the reaction products in inertial impulse when the nozzle shutter plate 16 breaks. The central piston 18 is moved by the differential force applied by the variable pressurization cavity 25, under the pressure of the reaction due to the pressure transmission through the orifices 17 in the siphon tube 12 at one side of the piston 28 and the pressure of the cylindrical inner cavity 23 of the rocket embodiment at the other side of that piston 28.

The process starts when a pressure increase is injected through the external pressure inlet 15, in the variable pressurization cavity 25. The overpressure in said variable pressurization cavity 25 forces the displacement of the central piston 18, displacing the mobile lateral wall 19 of the variable cylindrical cavity 22 and injecting water and the alkali element through the injectors 20,21, into the reaction chamber 1, where the alkali element and water reacts.

The reaction increases the pressure in the reaction chamber 1 and the variable pressurization cavity 25, as they are connected by the orifices 17 in the siphon tube 12. The nozzle shutter plate 16 breaks when a calibrated pressure is achieved in the reaction chamber 1. The reaction products are ejected through the siphon tube 12 and the nozzle 13, producing the impulsion of the rocket 17. The orifices 17 in the siphon tube 12 harmonize the pressure at both sides of the central piston 18, displacing that central piston 28 until both reactants in the water reservoir 2 and in the alkali deposit 3 are consumed. The reaction is extinguished when the central piston 18 reaches the injectors 20,21.

The water and alkali masses and volumes will be designed as to account for water in excess, adapting the position of the reactants separation walls 28, as it is shown in FIG. 3.

According to a particular embodiment of the invention, the power device may have heating means 26 configured to heat the alkali reservoir 3 and keep the alkali element at a predetermined temperature in order to keep the alkali element in liquid state. In case of sodium temperature should be higher than 98° C., whereas the case of potassium the temperature should be higher than 64° C. Particularly, these heating means 26 may have a tank with oil at a predetermined temperature, in which the alkali reservoir 3 is submerged. FIG. 1 shows an embodiment including these heating means 26 in the form of a tank with oil in which the alkali reservoir 3 is submerged.

The invention claimed is:

1. A power device based on alkali-water reaction, comprising:
    a reaction chamber configured to carry out a chemical reaction between water and an alkali element,
    an exhaust nozzle configured to exhaust the chemical reaction products generated in the reaction chamber,
    a siphon tube inside the reaction chamber, connected to the exhaust nozzle,
    a nozzle shutter plate sealing the exhaust nozzle and configured to be broken at a predetermined pressure, and
    an external pressure inlet configured to transmit pressure to the interior of the reaction chamber,
    a water reservoir configured to store water, and transfer the water to the reaction chamber,
    an alkali reservoir configured to store an alkali element, and transfer the alkali element to the reaction chamber, and
    transfer means connecting the reaction chamber to both reservoirs and configured to transmit pressure generated in the reaction chamber to the reservoirs, providing the transfer of the water and the alkali element from both reservoirs to the reaction chamber,
wherein
    the reaction chamber is concentrically placed inside a cylindrical inner cavity of a rocket, having the reaction chamber a top base,
    the water reservoir and the alkali reservoir are separated by at least a vertical separation wall, and placed inside the cylindrical inner cavity, at the same height, and separated from the reaction chamber by means of the top base,
    the transfer means comprises
        a first injector placed on the top base of the reaction chamber connecting the water reservoir to the reaction chamber and configured to transfer the water from the water reservoir to the reaction chamber,
        a second injector placed on the top base of the reaction chamber connecting the alkali reservoir to the reaction chamber and configured to transfer the alkali element from the alkali reservoir to the reaction chamber,
        a variable cylindrical cavity placed over the reaction chamber, including both reservoirs, the variable cylindrical cavity comprising in turn
            a central piston forming the upper base,
            a mobile lateral wall joined to the central piston,
        a variable pressurization cavity placed over the variable cylindrical cavity and separated from said variable cylindrical cavity by means of the central piston, wherein a siphon portion of the siphon tube is located in the variable pressurization cavity and is connected to the exhaust nozzle, and wherein the external pressure inlet is placed in the variable pressurization cavity,
        orifices placed in the portion of the siphon tube located in the variable pressurization cavity, configured to transmit the pressure generated in the reaction chamber to the variable pressurization cavity,
        and in that the central piston is configured to be displaced by means of the pressure transmitted by the reaction chamber to the variable pressurization cavity, transferring both water and alkali element to the reaction chamber through the first and second injectors.

2. The power device based on alkali-water, according to claim 1, comprising heating means configured to heat the alkali reservoir and keep the alkali element at a predetermined temperature.

3. The power device based on alkali-water, according to claim 2, wherein the heating means comprise a tank having oil at a predetermined temperature, in which the alkali reservoir is submerged.

4. The power device based on alkali-water, according to claim 1, wherein the exhaust nozzle is placed at an end of the reaction chamber.

5. The power device based on alkali-water, according to claim 1, wherein the siphon tube is placed along the entire length of the reaction chamber.

* * * * *